Figure 1:
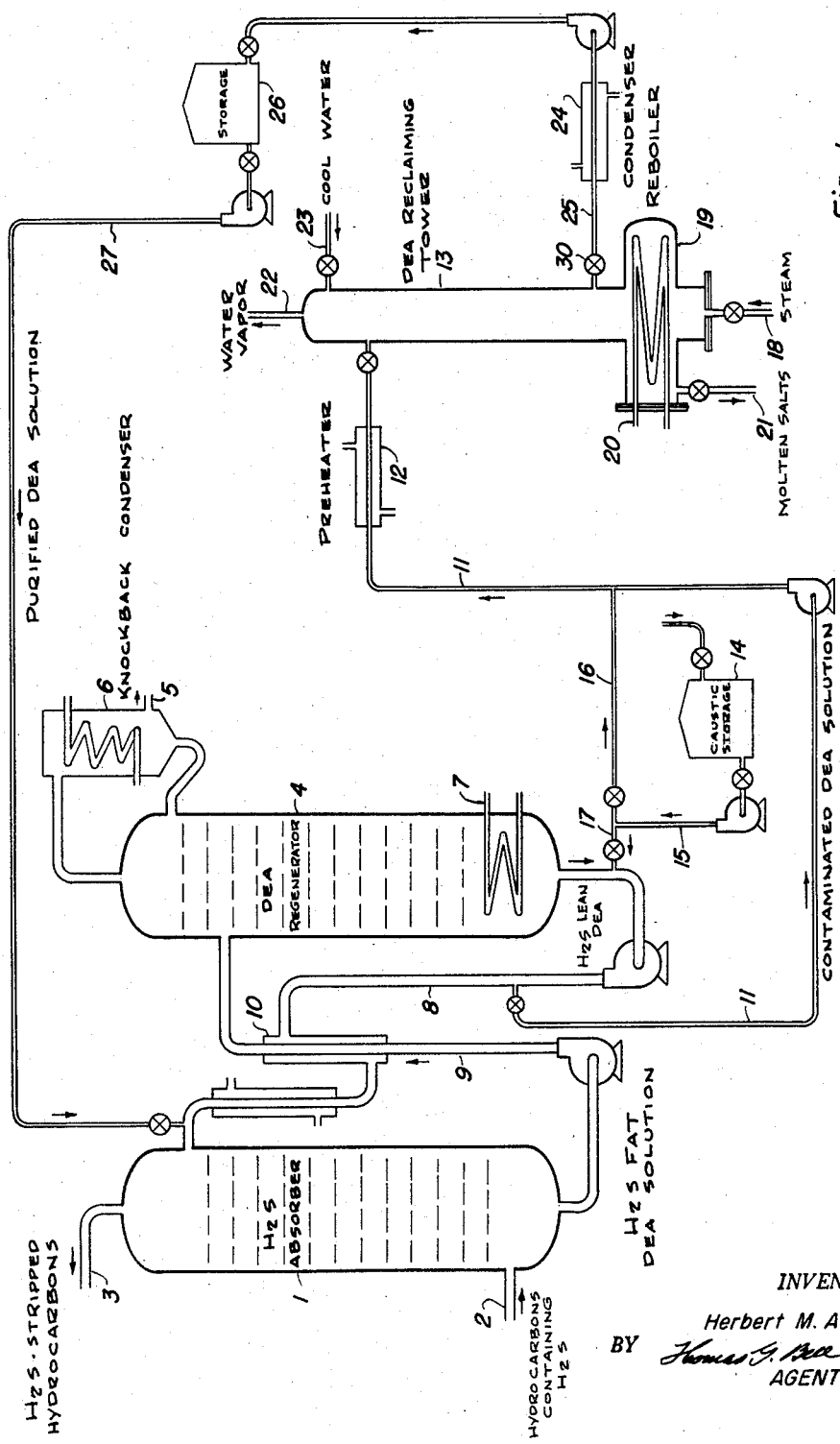

INVENTOR.
Herbert M. Anderson
BY
AGENT

INVENTOR.
Herbert M. Anderson

2,892,775
DIETHANOLAMINE RECOVERY BY STEAM STRIPPING

Herbert M. Anderson, Concord, Calif., assignor to Tidewater Oil Company, a corporation of Delaware Application April 16, 1954, Serial No. 423,600

8 Claims. (Cl. 208—236)

This invention relates to the purification of diethanolamine solutions and, in particular, to the removal of organic acid contaminants from such solutions by the formation of salts of said contaminants through the addition of caustic followed by steam stripping in a reclaiming tower specifically designed therefor. It is especially adapted to the purification of diethanolamine solutions which have been used in the regenerative removal of hydrogen sulfide from certain petroleum refinery operations.

In order to remove hydrogen sulfide from petroleum refinery gases and, also, from certain liquified petroleum products, it is common practice to contact hydrocarbon streams containing hydrogen sulfide with an aqueous solution of diethanolamine, whereby the hydrogen sulfide is absorbed, and then to regenerate the diethanolamine solution for continued use. This regeneration is accomplished by steam (or heat) stripping of the hydrogen sulfide from the diethanolamine solution. Such a procedure is described in U.S. Reissue Patent 18,958.

However, some refinery streams containing large quantities of hydrogen sulfide also include small amounts of stronger acidic materials such as formic acid, acetic acid and the like. These stronger acidic materials form more or less permanent diethanolamine salts which are not decomposed at the temperatures encountered during the hydrogen sulfide removal. Instead they result in the depletion of the diethanolamine reagent available as an absorbent and thereby increase the contamination of the diethanolamine solution. Since diethanolamine is a relatively expensive reagent it has been proposed to add caustic to the contaminated solution whereby the more weakly ionized diethanolamine will be freed for further continued use as an absorbent. However, this results in the gradual accumulation of a slush of alkali metal salts of the formic and acetic acids from which the diethanolamine absorbent is removable only with great difficulty.

Various methods have been suggested for the separation of diethanolamine absorbent from such contaminants. Some of these are solvent extraction, ion-exchange separation and steam stripping. Conventional steam stripping is carried out in a tower wherein steam under pressure is introduced into the bottom of the tower and volatile materials are separated as overhead products. While steam stripping has proven somewhat satisfactory for separating monoethanolamine from solutions containing non-volatile salts, it has been found to be unsuitable for recovering diethanolamine. The low vapor pressure of diethanolamine prevents its ready removal from the non-volatile contaminants as an overhead product unless heated to such an extent that decomposition of the diethanolamine results. In addition to the difficulty encountered in separating diethanolamine from contaminating salts, there is the further problem caused by the disproportionate dilution ratio between the water vapor and the diethanolamine vapor in the overhead product. This latter disadvantage necessitates an additional tower for concentrating the diethanolamine to a usuable strength by evaporating the enormous quantities of water diluent.

Now, the present invention comprises a novel design for a diethanolamine reclaiming tower, along with the mode of operation attendant thereto, which provides for improved yields of purified diethanolamine absorbent in suitable concentration. Moreover, an important embodiment of the invention is the elimination of excessive water diluent during the separation in the reclaiming tower, thereby avoiding the additional redistillation step required after conventional steam stripping in order to obtain purified diethanolamine solution in strengths suitable for return to the hydrogen sulfide recovery system.

In accordance with the invention, a specially designed reclaiming tower is arranged in conjunction with a conventional heater or reboiler. The reboiler provides the greater portion of the heat required for the process and also furnishes sufficient volume for the accumulation of contaminants as the bottoms product. The reclaiming tower is unique in the arrangement of lines connected thereto. It comprises a vent at the topmost portion for release of water vapor to the atmosphere. If desired, this water vapor may be recovered by means of a condenser. Entrance lines in the upper portion of the reclaiming tower are provided for the admission of contaminated diethanolamine and caustic solution. These lines may be in separate arrangement or integrated as desired; however, it generally will be preferable to allow for mixing of caustic and contaminated diethanolamine prior to admission into the upper portion of the reclaiming tower. An entrance line for admission of cooling water is provided in the upper portion of the tower. As an alternative thereto, a "knockback" may be found suitable. This cooling water line should be positioned above the diethanolamine and caustic inlet but below the water vapor escape vent. Small amounts of cooling water may be injected into the reclaiming tower through this line thereby washing entrained diethanolamine from the tower packing or separation trays back down the tower. This cooling water is also useful in controlling the temperature of diethanolamine vapors thereby preventing the escape of small amounts of this relatively valuable reagent through the water vapor vent. A steam line is positioned at the bottom of the reclaiming tower allowing for the passage of steam through the reboiler and upwards into the tower. In the lower section of the apparatus provision is made for maintaining a liquid level of molten contaminants, the excess being removed as required. The purified diethanolamine is removed as a vapor through a line located a slight distance above the level of the molten liquid in the reboiler and as a side draw-off from the reclaiming tower. It is an important feature of the invention that the diethanolamine vapor draw-off line be positioned near the lower portion of the tower. Between the draw-off line and the liquid level a screening, such as "demister pads," may be inserted for preventing the carryover of mist or spray. The exact location of this line is at a point where maximum yields of purified product may be obtained while at the same time allowing for the effective removal of contaminating salts. The distribution coefficient of water vapor and diethanolamine vapor in the reclaiming tower is a determining factor. As the height of the tower increases, so does the ratio of water to diethanolamine. Hence, the difficulty encountered in the use of classical distillation equipment is eliminated by providing a draw-off line just above the liquid level of the still bottoms. The rate and water content of diethanolamine vapor drawn off is controlled by the careful adjustment of a valve located in the draw-off line. After withdrawal from the tower, the diethanolamine vapor is condensed and may advantageously be passed through a liquid level trap to assist in controlling the flow.

It is desirable to operate the process in such a manner that a large portion of the water vapor resulting therefrom is released to the atmosphere through the top vent provided for that purpose. This will result in producing from the lower draw-off a purified diethanolamine solution in suitable concentration for return to the hydrogen sulfide absorption system.

One skilled in the art of steam distillation will readily appreciate the fact that the reclaiming tower may be packed to an extent and in a manner appropriate to preferred engineering design. A packed column of Raschig rings or a tower having an assembly of bubble trays is suggested as a means for effecting an efficient separation. The use of temperature controllers, flow meters, proportioning pumps and the like may be found desirable. The process and apparatus of the present invention readily conform to the application of automatic control equipment and the use thereof is recommended.

Figure 2:
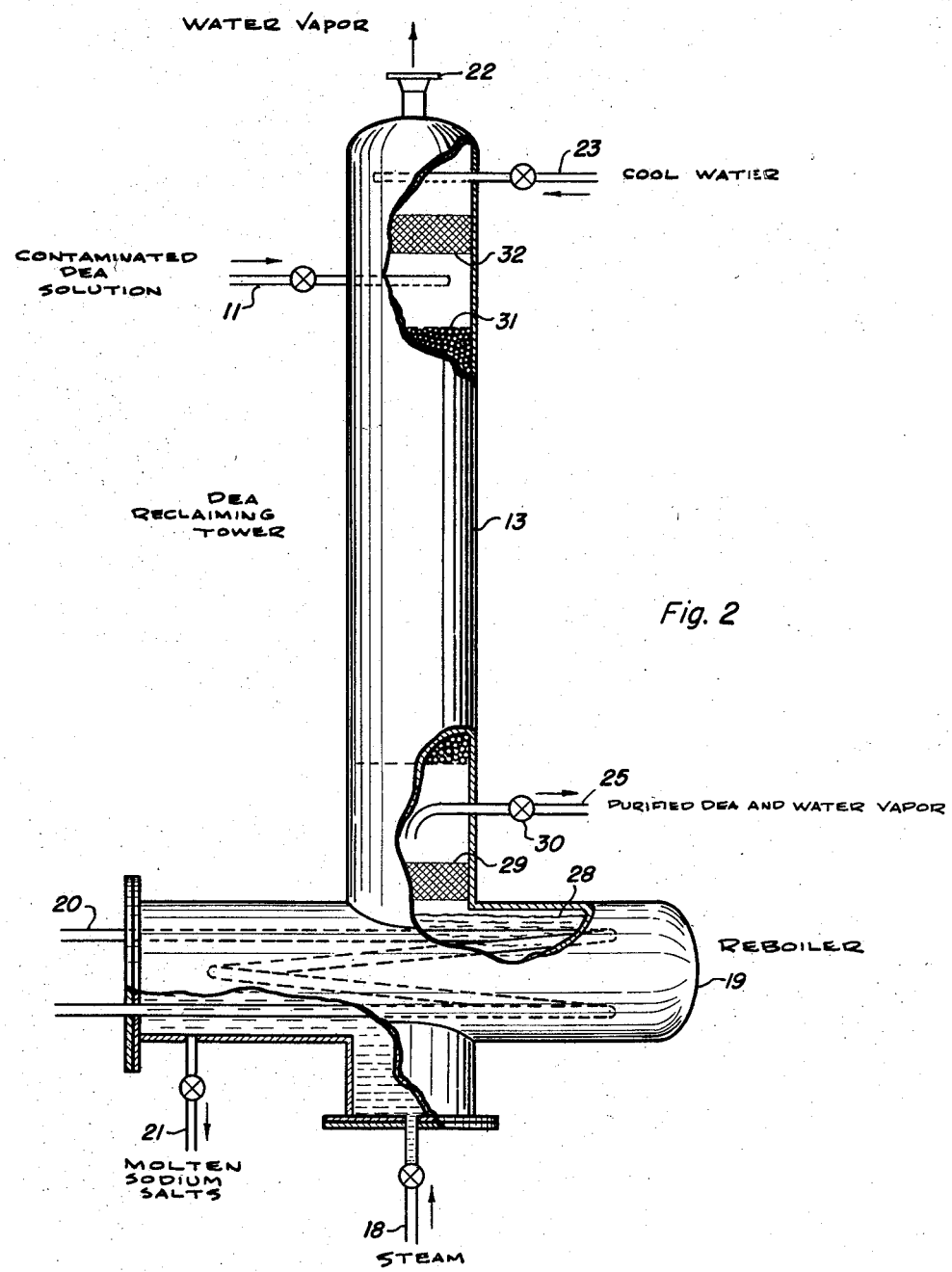

The invention may be more readily understood by reference to the accompanying drawing wherein Figure 1 illustrates in diagrammatic form its relationship with a hydrogen sulfide-ethanolamine treating process, and Figure 2 is an enlarged view of the reclaiming tower.

In the drawing, the hydrogen sulfide regenerative removal process is represented by absorber 1, having inlet line 2 for a gaseous stream of hydrocarbons containing hydrogen sulfide along with other acid gases, outlet line 3 for the return of stripped hydrocarbons, regenerator 4 with hydrogen sulfide gas outlet 5 attached to the regenerator by means of "knockback" condenser 6, heater 7 for supplying stripping action to the regenerator, line 8 for transferring $H_2S$ lean ethanolamine solution from regenerator 4 to absorber 1, and transfer line 9 for transferring $H_2S$ fat ethanolamine solution from absorber 1 to regenerator 4 through heat exchanger 10. Line 11 provides for diethanolamine solution contaminated with salts of relatively strong acidic materials to be fed at a controlled rate through preheater 12 into the upper portion of the specially designed reclaiming tower 13. Caustic from storage tank 14 may be pumped at a desired rate through lines 15, 16 and 11 into the upper portion of reclaiming tower 13 and/or from tank 14 through lines 15 and 17 into transfer line 8. Line 18 provides for the admission of steam into reclaiming tower 13 through the reboiler 19 which encloses heating coil 20 used to maintain the contaminants in molten state for removal through line 21. Vent 22 allows for the escape of water vapor into the atmosphere and line 23 is provided for the admission of cooling water to maintain the temperature of the vapors in the top of the reclaiming tower within a range sufficient to prevent the escape of valuable diethanolamine. Water and diethanolamine vapors leave reclaiming tower 13 through valve 30 and condenser 24 in line 25 and then return to the main hydorgen sulfide recovery system via surge or storage tank 26 and line 27.

While Figure 1 of the drawing illustrates the invention as applied to a hydrogen sulfide-ethanolamine treating process, Figure 2 shows the reclaiming tower 13 in detail. Tower packing, such as Raschig rings, is represented by 31 and screening, such as for example "demister pads," is represented by 29 and 32. The liquid level of molten salts in reboiler 19 is represented by 28. This level is maintained by proper regulation of the valve located in line 21.

The flow rate and concentration of diethanolamine vapor in draw-off line 25 is controlled by means of valve 30 which may be opened or closed to provide optimum yields of purified diethanolamine vapors. It will be found that too wide an opening of valve 30 will result in excessive dilution of the diethanolamine vapors by the water vapors thereby admitted into line 25. On the other hand, should passage of vapors flowing into line 25 be too greatly restricted, diethanolamine vapors will not be drawn off in sufficient amounts and will result in excessive amounts of diethanolamine reaching the upper part of tower 13 and excessive losses through vent 22. Accordingly, it will be readily apparent that a careful adjustment of valve 30 is required throughout the process. Several factors are involved herein, some of which are: temperature of liquid in the reboiler, amount and temperature of steam admitted through the hot liquid, dimensions of the reclaiming tower, amount of packing and degree of reflux obtained in the tower, concentration of contaminants and diethanolamine along with the flow rate of the feed to the tower, amount of cooling water added to the tower, and so forth. Consequently, the preferred degree of opening of valve 30 will be determined by the operator of the apparatus and process in accordance with the description set forth herein. It has been found that, with an efficient stripping tower and with a temperature in reboiler 19 between 400° and 475°' F., satisfactory operation can be obtained by regulating valve 30 to produce a stream in line 25 approximately equal (on a liquid basis) to twice that entering tower 13 through line 11, while introducing steam through line 18 equal (on a liquid basis) to about twice or three times the water content of the stream in line 11.

The invention may be illustrated by its application to a typical hydrogen sulfide recovery unit wherein about 300,000 gallons per day of diethanolamine solution are circulated through an absorber-stripper unit to treat refinery gases containing about 35 tons per day of hydrogen sulfide. During the circulation of diethanolamine through this unit, relatively strong acids, such as formic, acetic and the like, present in small quantities in the refinery gases form fairly stable products with the diethanolamine. The addition of caustic to the solution "frees" the diethanolamine for repeated use until excessive amounts of sodium salts render the absorbent diethanolamine solution viscous and sluggish.

Diethanolamine solution lean in absorbed $H_2S$ and containing 20 weight percent "free" diethanolamine (204 pounds per hour), diethanolamine formate (combined diethanolamine) equivalent to 10 pounds per hour diethanolamine and 4.5 pounds per hour of formic acid, sodium formate (125.5 pounds per hour) and water (676 pounds per hour) is withdrawn at a rate of 120 gallons per hour in a small side stream from the bottom line of the $H_2S$ striper unit which is operated at about 260° F. bottoms temperature. To decompose the diethanolamine formate, caustic soda of about 30° Baumé is mixed in the line with the contaminated diethanolamine solution. Although 4 pounds per hour of NaOH is theoretically sufficient to decompose the diethanolamine formate, to insure an excess of caustic in the reclaiming tower the amount actually used is about twice that required for decomposition (8 pounds per hour of NaOH and 24 pounds per hour of water).

The neutralized and alkaline diethanolamine solution is passed through a preheater, which raises the temperature to about 350° F., and thence into the upper portion of the reclaiming tower. The bottoms temperature of the tower is maintained at about 450° F. by means of hot oil circulating in the heating coil of the reboiler. To provide stripping, steam at a rate of about 1670 pounds per hour, preferably superheated, is introduced through the bottom of the tower. Cooling water is added to the top of the tower, as required, at a rate of about 100 pounds per hour to assist in temperature control as well as to wash back any diethanolamine reaching the upper portion of the tower. Approximately 528 pounds per hour of water vapor leave the top vent of the reclaiming tower. After a short period of operation, molten salts in a saturated solution will accumulate as bottoms product in the reclaiming tower and may be withdrawn at a rate of about 150 pounds per hour (125.5 pounds per hour carried over from the absorber-stripper unit, 6.5 pounds per hour formed from the diethanolamine formate, 4 pounds per hour of excess free NaOH and 14 pounds per hour of water).

Purified diethanolamine, free from contaminating salts, is withdrawn from the reclaiming tower through the exit line advantageously positioned in the lower portion of the tower, as described herein, at a strength of about 10 weight percent diethanolamine and at a flow rate of about 2142 pounds per hour (214 pounds per hour "free" diethanolamine and 1928 pounds per hour water).

Determination of purity of the product indicates that the total diethanolamine found therein is in the "free" or uncombined state, i.e., free of formates, acetates and the like, suitable for reuse in the hydrogen sulfide absorber-stripper unit.

While in the foregoing there are described the preferred embodiments of the invention which have been found in practice to give satisfactory and reliable results, it is to be understood that the same is susceptible of modification in various particulars without departing from the spirit or scope of the invention or sacrificing any of its advantages. For instance, the temperatures, flow rates and concentrations may vary to a limited degree with the process still retaining its advantages. The invention may be applicable to periodic use as well as to continuous operation. While strong caustic (47° Baumé) would be advantageous to use as a neutralizing agent because of the minimum amount of water thereby introduced into the system, it is usually preferable to use more dilute material (e.g., 30° Baumé) because of ease in handling and avoidance of solidification at reduced temperatures anticipated in cold weather operation. Moreover, in lieu of adding caustic to the H₂S lean diethanolamine solution in the side stream leading to the reclaiming tower, it may be added directly to the diethanolamine absorbent in the absorber-stripper system in amounts sufficient to "free" the diethanolamine from its combination with contaminating materials, by replacing the combined diethanolamine with sodium ions thereby forming sodium salts. The resulting metal salts are then circulated through the absorber-stripper system and eventually drawn off through the side stream to the reclaiming tower where they are removed as bottoms products. While sodium hydroxide is found to be completely satisfactory for use in the invention, other alkaline or caustic reagents will suggest themselves to those skilled in the art. For example, it is contemplated that potassium hydroxide be used as an alternative to caustic soda.

While relatively strong acidic contaminants such as formic and acetic acids are generally encountered in this type of absorption operation, the invention is also useful in separating other acidic contaminants such as, for example, cyanides, ferri-cyanides and the like.

I claim:

1. In a process for treating petroleum fractions containing relatively large amounts of hydrogen sulfide and relatively small amounts of stronger acids and wherein the petroleum fractions are treated with aqueous diethanolamine solution to remove said hydrogen sulfide and said stronger acids by chemical combination with said diethanolamine and wherein said diethanolamine solution is regenerated by steam stripping said hydrogen sulfide in a gaseous state from the liquid diethanolamine in water solution, said stronger acids not being removable by simultaneous stripping along with said hydrogen sulfide, the method of preventing the accumulation of diethanolamine salts of said stronger acids in said diethanolamine solution and for enabling re-use of the diethanolamine content thereof without decomposing the diethanolamine during vaporization thereof, comprising: withdrawing the regenerated and stripped diethanolamine solution containing substantial quantities of said salts; adding to the withdrawn solution alkali in substantial excess over that required to free the diethanolamine from said salts by replacing its ions with those of said alkali; injecting a stream of the resultant solution containing free diethanolamine and alkali salts of said stronger acids into the upper portion of a reclaiming zone to pass downwardly through said zone; maintaining a hot pool consisting principally of said alkali salts of said stronger acids in a liquefied state below said zone, toward which said stream passes and at the surface of which said diethanolamine and water are almost instantaneously vaporized; injecting steam into said pool and passing said steam upwardly therethrough and through said zone countercurrently to said stream; withdrawing a mixture of diethanolamine vapor and water vapor just above the level of said pool, so that the heat from said pool vaporizes said diethanolamine and so that the vaporized diethanolamine is not held at its vaporization temperature long enough to result in its substantial decomposition; condensing the withdrawn vapors to an aqueous solution of substantially pure diethanolamine; and returning the withdrawn diethanolamine to said process for treating petroleum fractions.

2. The method of claim 1, wherein cooling water is injected into said zone above the point of introduction of said stream and below the point of withdrawal of said water vapor, for condensation of and downward movement of traces of diethanolamine in a vapor state in said zone above the point of withdrawal of said mixture of diethanolamine and water vapors.

3. The method of claim 2 wherein a flow balance is maintained by continuously introducing said stream, continuously introducing said steam, continuously introducing of said cooling water, continuously withdrawing said salts to keep said pool at a substantially constant level, continuously withdrawing said water vapor from the top of the reclaiming zone, and continuously withdrawing of said mixture of diethanolamine vapor and water vapor at a rate fast enough to minimize upward passage of diethanolamine vapors and slow enough, that said diethanolamine vapor is not unduly diluted with water vapor.

4. The steps in the method of recovering diethanolamine from a contaminated solution resulting from treatment of a petroleum fraction containing relatively large amounts of hydrogen sulfide and relatively small amounts of stronger acid which accumulatively make the diethanolamine ineffective for hydrogen sulfide removal, and from which solution the hydrogen sulfide has been stripped by usual methods, and the acids converted to alkali salts, which comprises: introducing a stream liquid of the contaminated solution into the upper portion of a reclaiming zone; passing said stream downwardly through said zone to a pool of liquid of greater surface area than the cross-section area of said stream and consisting principally of said salts alkali in a molten state maintained at a predetermined level and at a temperature between about 400° F. and 475° F.; injecting steam into said pool in quantity immediately to vaporize said diethanolamine as it touches said surface; passing said steam upwardly through said zone in intimate contact with and countercurrent to said stream; withdrawing water vapor from said zone higher than where said stream liquid is introduced; and withdrawing diethanolamine vapor mixed with water vapor from and just above the level of said pool, whereby to minimize the quantity of steam required and by withdrawing the diethanolamine substantially as soon as vaporized it is not kept at its temperature of vaporization long enough to effect its decomposition.

5. In a process for removing non-volatile salts from an aqueous diethanolamine solution containing them and for obtaining substantially pure aqueous diethanolamine solution without decomposing the diethanolamine, the steps comprising adding alkali to said solution in substantial excess over that sufficient to render the diethanolamine in an uncombined state; passing a stream of the resultant solution downwardly through a reclaiming zone in countercurrent flow to steam introduced upwardly through and heated by a pool of liquid whose level lies below said zone, the temperature of said pool being above 450° F.; withdrawing a mixture of diethanolamine vapor and water vapor just above the level of said pool; and withdrawing excess water vapor above said zone; whereby the diethanolamine is withdrawn after vaporization and before decomposition.

6. The process according to claim 5 wherein the level of said pool is maintained just below the withdrawal point of the diethanolamine by removing from said pool a sufficient amount of non-volatile material.

7. The process according to claim 4 wherein the temperature of the pool of liquid is maintained at about 450° F.

8. The process according to claim 4 wherein the withdrawal of diethanolamine vapor mixed with water vapor below the reclaiming zone is maintained at a flow rate sufficient to provide a ratio of diethanolamine vapor to water vapor of at least about 1 to 9.

References Cited in the file of this patent
UNITED STATES PATENTS

| | | |
|---|---|---|
| 1,919,599 | Schonberg | July 25, 1933 |
| 1,962,235 | De Florez | June 12, 1934 |
| 2,007,166 | Hund et al. | July 9, 1935 |
| 2,238,201 | Wilson et al. | Apr. 15, 1941 |
| 2,248,109 | Morrison et al. | July 8, 1941 |
| 2,311,342 | Kerns et al. | Feb. 16, 1943 |
| 2,497,954 | McCulley | Feb. 21, 1950 |
| 2,701,750 | Paulsen et al. | Feb. 8, 1955 |
| 2,726,992 | Easthagen et al. | Dec. 13, 1955 |
| 2,797,188 | Taylor et al. | June 25, 1957 |